Oct. 20, 1970   W. M. SCHWARTZ, JR., ET AL   3,535,493
PERCOLATOR

Filed Oct. 31, 1966   7 Sheets-Sheet 1

INVENTORS:
WALTER M. SCHWARTZ, JR.
CHARLES R. TURNER
LUTHER P. MANSHIP
BY Howson & Howson
ATTYS.

Oct. 20, 1970   W. M. SCHWARTZ, JR., ETAL   3,535,493
PERCOLATOR

Filed Oct. 31, 1966   7 Sheets-Sheet 3

INVENTORS:
WALTER M. SCHWARTZ, JR.
CHARLES R. TURNER
LUTHER P. MANSHIP

BY Howson & Howson

ATTYS.

Oct. 20, 1970  W. M. SCHWARTZ, JR., ETAL  3,535,493
PERCOLATOR

Filed Oct. 31, 1966

INVENTORS:
WALTER M. SCHWARTZ, JR.
CHARLES R. TURNER
LUTHER P. MANSHIP

BY *Howson & Howson*

ATTYS.

Oct. 20, 1970    W. M. SCHWARTZ, JR., ET AL    3,535,493
PERCOLATOR

Filed Oct. 31, 1966    7 Sheets-Sheet 6

INVENTORS:
WALTER M. SCHWARTZ, JR.
CHARLES R. TURNER
LUTHER P. MANSHIP
BY Howson & Howson
ATTYS.

Oct. 20, 1970 W. M. SCHWARTZ, JR., ETAL 3,535,493

PERCOLATOR

Filed Oct. 31, 1966 7 Sheets-Sheet 7

INVENTORS:
WALTER M. SCHWARTZ, JR.
CHARLES R. TURNER
LUTHER P. MANSHIP

BY Howson & Howson

ATTYS.

United States Patent Office 3,535,493
Patented Oct. 20, 1970

3,535,493
PERCOLATOR
Walter M. Schwartz, Jr., and Charles R. Turner, Philadelphia, and Luther P. Manship, Collingdale, Pa., assignors to Proctor-Silex Incorporated, Philadelphia, Pa., a corporation of New York
Filed Oct. 31, 1966, Ser. No. 590,585
Int. Cl. F27d 11/00
U.S. Cl. 219—441                                    31 Claims

ABSTRACT OF THE DISCLOSURE

A percolator is provided having a plurality of components and having a plurality of quick disconnect features employing latch means for easy assembly of the components manually and without their use of tools.

---

The present invention relates to an electric coffee percolator and, more particularly, to a percolator having component parts which can be easily and quickly assembled and disassembled manually and without the use of tools.

In the prior art many percolators have been designed having components which are capable of being assembled and disassembled for repair or replacement of parts. The components of these percolators have been held together by fastening means requiring tools to enable the percolator to be disassembled into its component parts in servicing the appliance when defective.

In a U.S. Pat. No. 3,282,196 entitled "Coffee Percolator" of Manship et al., and of common assignee herewith, there is described a coffee percolator having components including a base and a container for liquid, which are held together by manually releasable latch means. The invention disclosed in that patent has many advantages as pointed out therein, the present invention being an improvement thereon.

For the most part, when a percolator becomes defective the components have not been arranged and designed such that an unskilled user can repair or replace the defective part. The repair of the defective appliance, other than replacement of a defective or broken container as taught in the above-cited patent, usually requires that the appliance be taken to an experienced repairman and, in most instances, it is difficult to obtain fast, economical and effective service. The cost of repair of a coffee percolator frequently approaches the purchase cost of the entire percolator. For this reason, a broken handle or base, or a damaged heat-pump well or thermostatic control switch of a percolator may either result in excess cost of repair or the repair not being undertaken and the percolator either discarded or used with dissatisfaction.

In percolators of the type having electric lamps in the base for illuminating a glass container, such as described in the above-cited patent, the closure for the base has not been adapted for easy removal and replacement to provide ready access into the base. The present invention overcomes the stated disadvantages of prior art percolators and to an important degree makes it possible for percolators to last a lifetime, permitting replacement as necessary of any of the several components which may become damaged or defective. Moreover, the present invention makes it possible to replace the various component parts of the percolator by using only the hands of the normal user, such as a housewife, and not experienced or skilled labor.

In accordance with the present invention, a percolator is provided comprising a plurality of component parts including at least a container for liquid, a base having a peripheral wall and an opening in its top, and a closure for the top opening of the base. The base component preferably includes heating means having walls defining a heat-pump well engageable through the closure and a thermostatic control switch for regulating percolation. In preferred embodiments, the percolator in accordance with the invention may be subdivided into as many components as are practical as dictated by the problems of a given percolator structure. Thus, a separate heating means component including a heat-pump well and thermostatic control switch may be desired. Preferably, the heating means component is interlocked with at least two of the other components when the manually releasable fastening means is effective.

In order to accomplish the objectives of the present invention, the means for interconnection of the various component parts must be very simple so that a housewife will have a minimum of difficulty in assembling and disassembling the employed component parts. In accordance with the present invention, the components have manually operable fastening means for releasably coupling the closure to the base and the container to at least one of the other components. In this arrangement, the fastening means permits assembly and disassembly of the components manually and without the use of tools. Preferably, the manually operable fastening means includes latching means interconnecting the closure and base components.

In the preferred form of the invention, the base includes heating means having walls defining a heat-pump well and circuit means connectable to a source of power for supplying current to the heating means. Preferably, the closure is provided with interlocking means for preventing the closure from being removed from the base when the circuit means is connected to a source of power. The closure is preferably provided with alignment members and the base is provided with mating alignment means adapted to receive the alignment members for positioning the closure on the base. In preferred embodiments, the circuit means in the base has terminal means supported in the base, and socket means for an electric lamp is supported by the closure between the closure and the base and has terminal members adapted to contact the terminal means of the circuit means when the closure is latched to the base. Preferably, the various components have such contours that they can be assembled together in only one possible way in order to avoid errors in assembly.

With the selection of a number of component parts for the percolator and coupling the parts together by manually operable fastening means, a defective or broken component part can be easily and quickly removed from the percolator without the use of tools for disassembly and reassembly, thereby avoiding costly repair and labor expenses. The faulty component can be discarded and a new component of exactly the same size and shape substituted into the percolator. It should be appreciated that the percolator in accordance with the present invention can provide a lifelong appliance only requiring easy replacement of broken or defective component parts by unskilled persons.

For a better understanding of these and other features and advantages of the present invention, reference is made to the following drawings, in which.

Referring to FIGS. 1–9, there is illustrated a coffee percolator comprising a plurality of component parts which are coupled together in an operative form by manually operable fastening means. The number of component parts employed and their interconnection may vary depending upon the desires of the manufacturer. The component parts for the percolator preferably comprise a limited number of easily assembled and replaceable parts, which are coupled together by fastening means not requiring tools for removal and disassembly of the component parts.

There is shown in FIGS. 1, 2 and 5–9 a percolator comprising component parts including a support base generally designated 10 having a peripheral wall 10a and an opening at its top, a closure generally designated 12 for the top opening of the base, and a container 14 for liquid mounted on the base. The support base 10 provides a generally cylindrical, hollow cup-shaped structure, preferably molded with integral feet 10b of resinous material. Support base 10 has a separate handle 16 of similar material rigidly secured to the base, as by a screw, the handle extending upwardly from one side of the base. The closure 12 comprises a pan 17 providing a shallow well at the top opening of the base and extending within the peripheral sidewall 10a of the base. Container 14, preferably constructed of heat resistant glass, is nested within the shallow well of pan 17 and is clamped in position by latch means generally designated 18 in the upper portion of handle 16. Container 14 is provided with an inverted cup-shaped lid 20 of sheet metal surmounted by a knob 22, preferably of a molded resinous material. The lid 20, which nests within the divergently outwardly flared collar of the glass container, encloses the top portion of a coffee basket 24 located in the top opening of the cup-shaped glass container. A fountain tube 26 extends downwardly from coffee basket 24 to heating means mounted in base 10. An electric cord 30 is provided for supplying electrical current to the heating means in the base and is connected to terminals of the percolator by a connector generally designated 32, which is suitable for being removed from the terminals in the base. The component parts of the percolator shown in FIGS. 1, 2, and 5–9 are coupled together in an operative assembly by manually releasable fastening means associated with each component part, each fastening means being adapted to engage selectively at least one of the other component parts to hold the percolator components firmly together.

As shown in FIGS. 2, 6, 7, 9 and 23, the heating means in the base comprises a cup-shaped, heat-pump well generally designated 36 centrally positioned in the base. The upper lip of the heat-pump well provides a collar 38 which extends upwardly into container 14 through aperture 40 centrally located in the bottom of container 14. The bottom of the heat-pump well is provided with a downwardly extending portion which enables the well to be secured to the bottom of the base, as by a screw. Two resistance heaters 42 and 44 are provided around the sidewalls of heat-pump well 36 and are electrically insulated from the well but in heat-transfer relationship with well 36.

Figure 6:
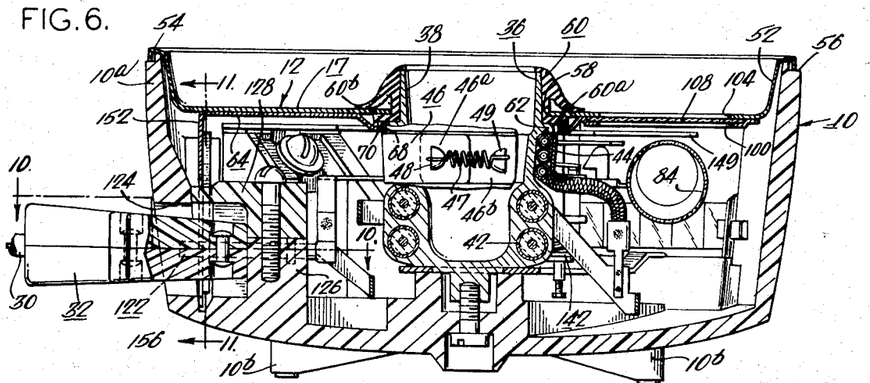
FIG. 6 is a sectional view taken along line 6—6 of FIG. 5.
Figure 9:
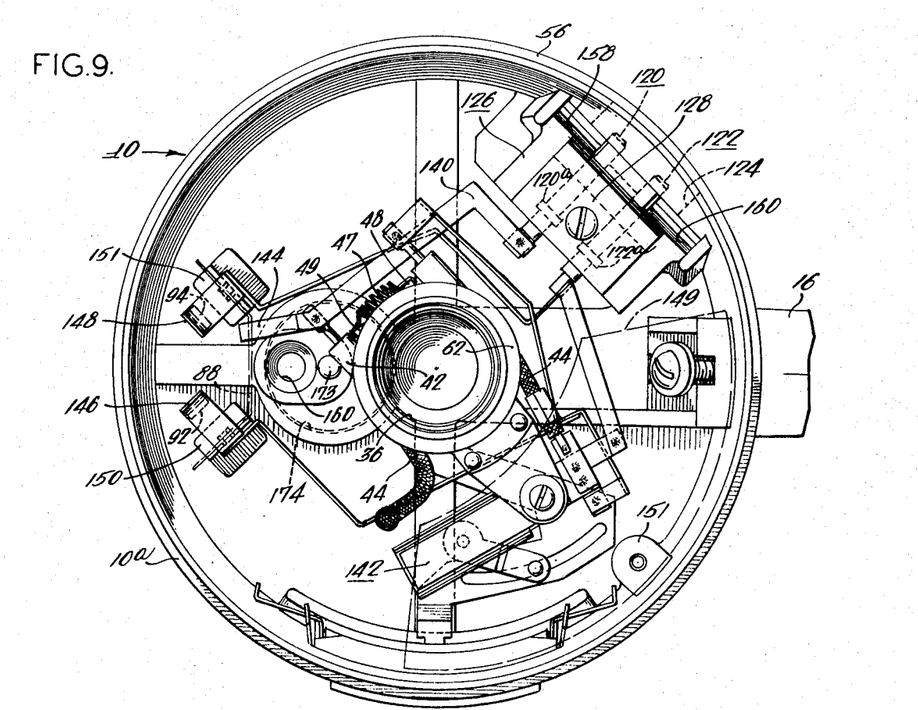
FIG. 9 is a plan view of the base of FIG. 6 with the closure removed.
Figures 13, 14, 15, 16, 17, 18, 19, 20, 21, 22, 23:
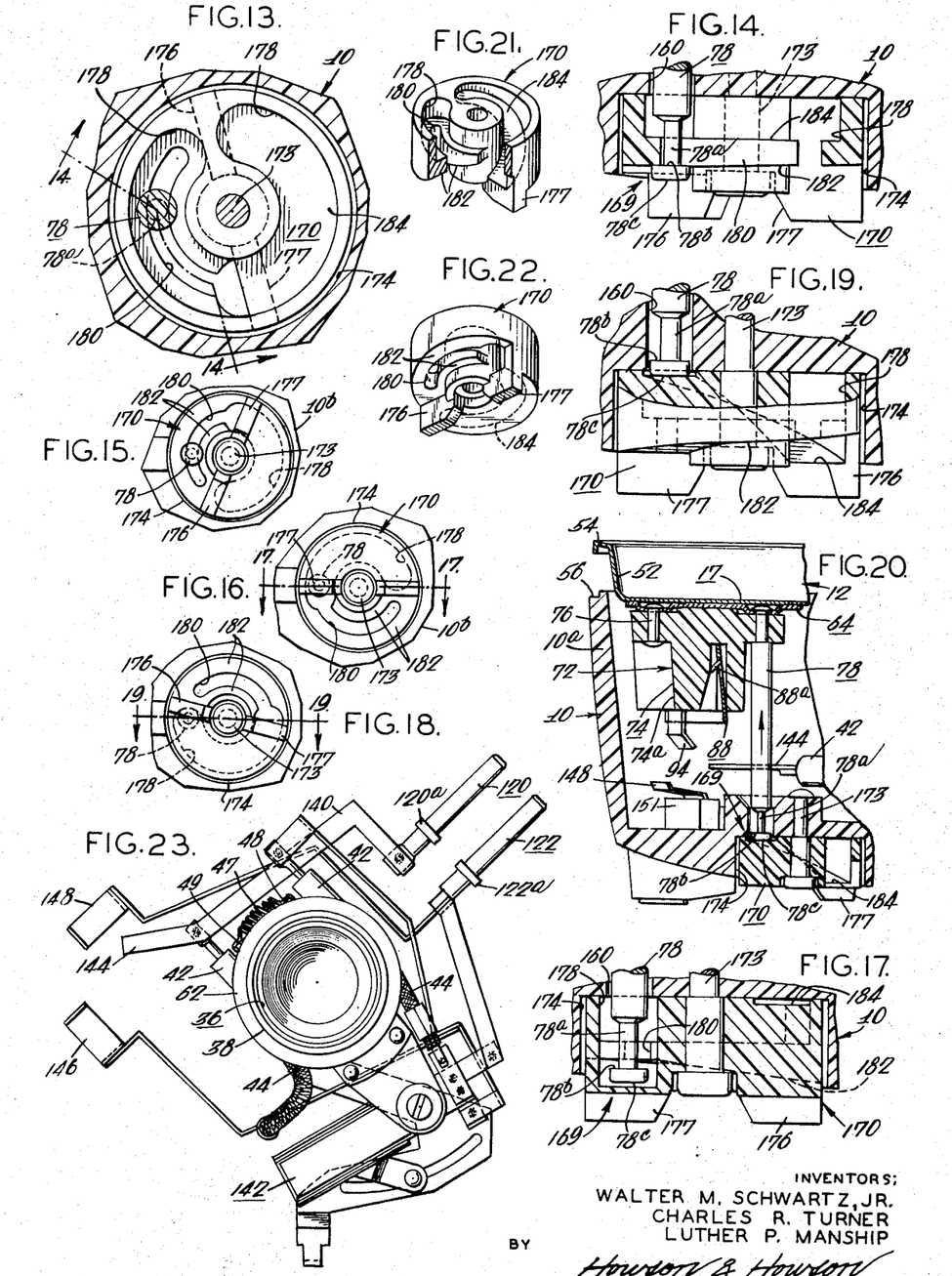
FIG. 13 is an enlarged fragmentary sectional view taken along line 13—13 of FIG. 2.
FIG. 14 is a fragmentary sectional view taken along line 14—14 of FIG. 13.
FIG. 15 is a fragmentary inverted plan view of the latch member in locking relationship with the pin as viewed from line 15—15 of FIG. 2.
FIG. 16 is a fragmentary inverted plan view of the latch member of FIG. 15 but showing the latch member in its position for receiving the pin.
FIG. 17 is a fragmentary sectional view of the latch member and pin taken along line 17—17 of FIG. 16.
FIG. 18 is a fragmentary inverted plan view of the latch member of FIG. 15, but showing the latch member in its position for separating the closure from the base.
FIG. 19 is a fragmentary sectional view of the latch member and pin taken along line 19—19 of FIG. 18 and showing a portion of the latch member in full lines.
FIG. 20 is a fragmentary sectional view similar to FIG. 19 and showing the closure separated from the base by the latch member and pin interaction.
FIG. 21 is a perspective view of the top portion of the latch member of FIGS. 13–19 with a portion of the latch member broken away.
FIG. 22 is a perspective view of the bottom portion of the latch member of FIG. 21.
FIG. 23 is a plan view of the heat-pump well, thermostatic control switch and associated circuitry similar to FIG. 9 with the base omitted.

More specifically, primary heater 42 is provided by a tubular type unit of resistance wire in helical form packed in an insulating material within steel tubing and is molded into the lower portion of the sidewalls of heat-pump well 36. Primary heater 42 is adapted to perform the percolating operation. Secondary heater 44 is provided to maintain the brewed coffee at a predetermined temperature after percolation is completed. Preferably, the secondary heater is provided by an inexpensive heater of greater resistance than the primary heater and one which avoids the use of an expensive insulating sleeve for permitting molding of the secondary heater in the heat-pump well. As shown most clearly in FIGS. 2, 6, and 23, the secondary heater is preferably provided by resistance wire in helical form within a woven fiberglass insulating jacket and is wrapped around the heat-pump well at a reduced wall thickness portion above the location of primary heater 42. In prior art percolators employing this arrangement, an adhesive tape has been used to hold the secondary heater to the heat-pump well. However, at the temperatures to which the heat-pump well is heated, the adhesive tape smokes and smells until the adhesive material is burned from the tape, and this process is carried out by the manufacturer before sale of the percolator. Also, after the adhesive material has been burned from the tape, the tape becomes fragile. In the present percolator which is designed for lifelong use with easily separable component parts, the fragile tape is subject to damage in assembling and disassembling the components. Furthermore, in employing the adhesive tape, all turns of the secondary heater may not be in tight engagement with the heat-pump well when the tape is wrapped around the well. In order to avoid these problems with tapes and to assure good thermal contact between the secondary heater and the well, there is provided a flexible strip 46 of metal positioned over the secondary heater around the walls of the heat-pump well. Opposed ends 46a and 46b of the strip are arranged to be in overlapping relation with one another and urged together to firmly hold the secondary heater in good thermal contact with the heat-pump well. The opposed ends of strip 46 are urged together by a coiled spring 47, which has its opposite ends engaged in louvered portions 48 and 49 of strip 46 adjacent its overlapping ends 46a and 46b, as shown in FIGS. 6, 9 and 23. The strip assures that the turns of the secondary heater are not overlapping or out of place, since the strip will not have its ends overlapping properly to be held together by the spring unless the turns of the secondary heater are tightly against the heat-pump well in good thermal contact with the well.

Figures 1, 3, 4, 5:
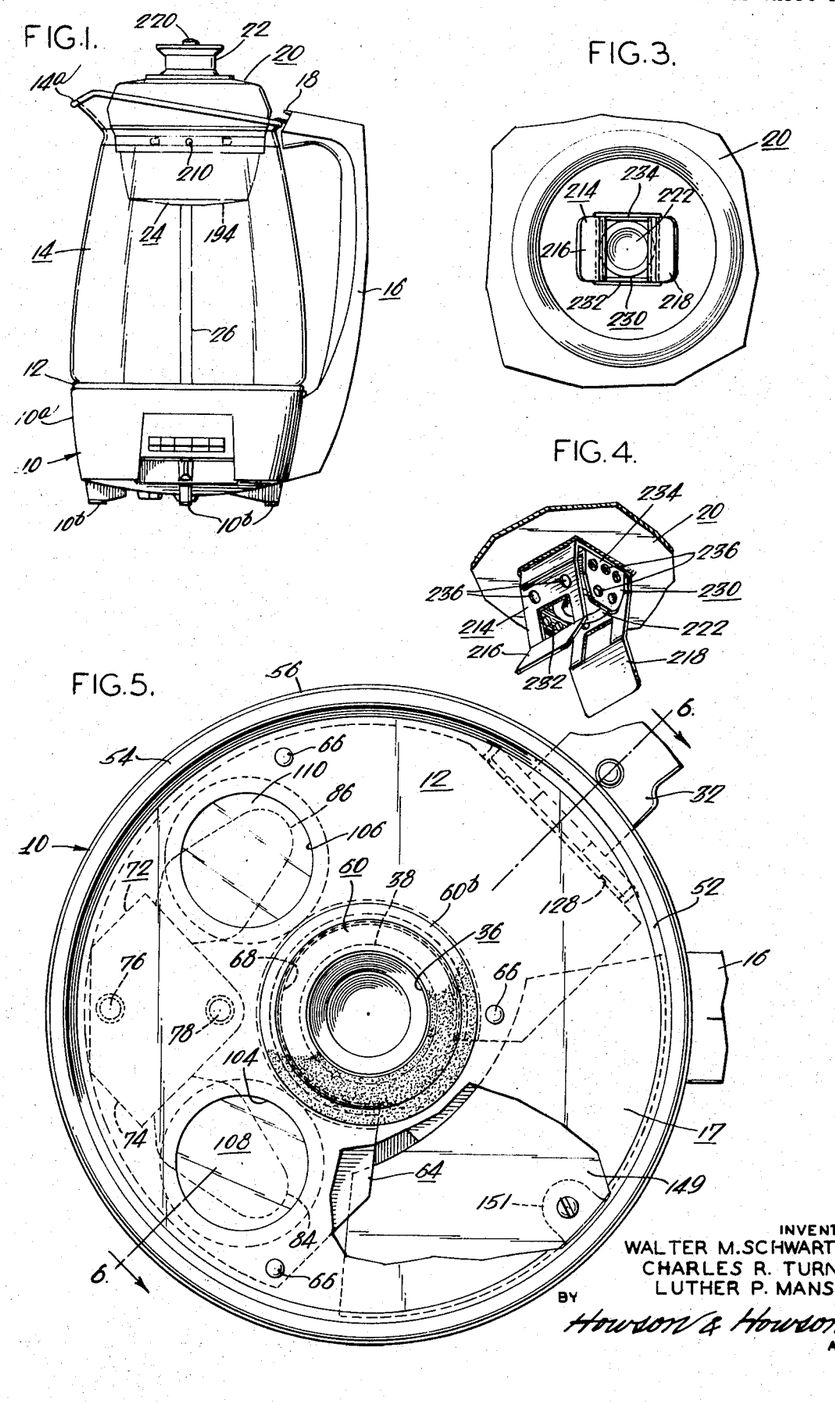
FIG. 1 is a side elevational view of a coffee percolator embodying the present invention.
FIG. 3 is a fragmentary sectional view taken along line 3—3 of FIG. 2 with the upstanding tube and the coffee basket removed.
FIG. 4 is a fragmentary perspective view of the under structure of the lid shown in FIG. 3.
FIG. 5 is a fragmentary sectional view taken along line 5—5 of FIG. 2 with the container for liquid removed and a portion of the closure for the base broken away.
Figure 2:
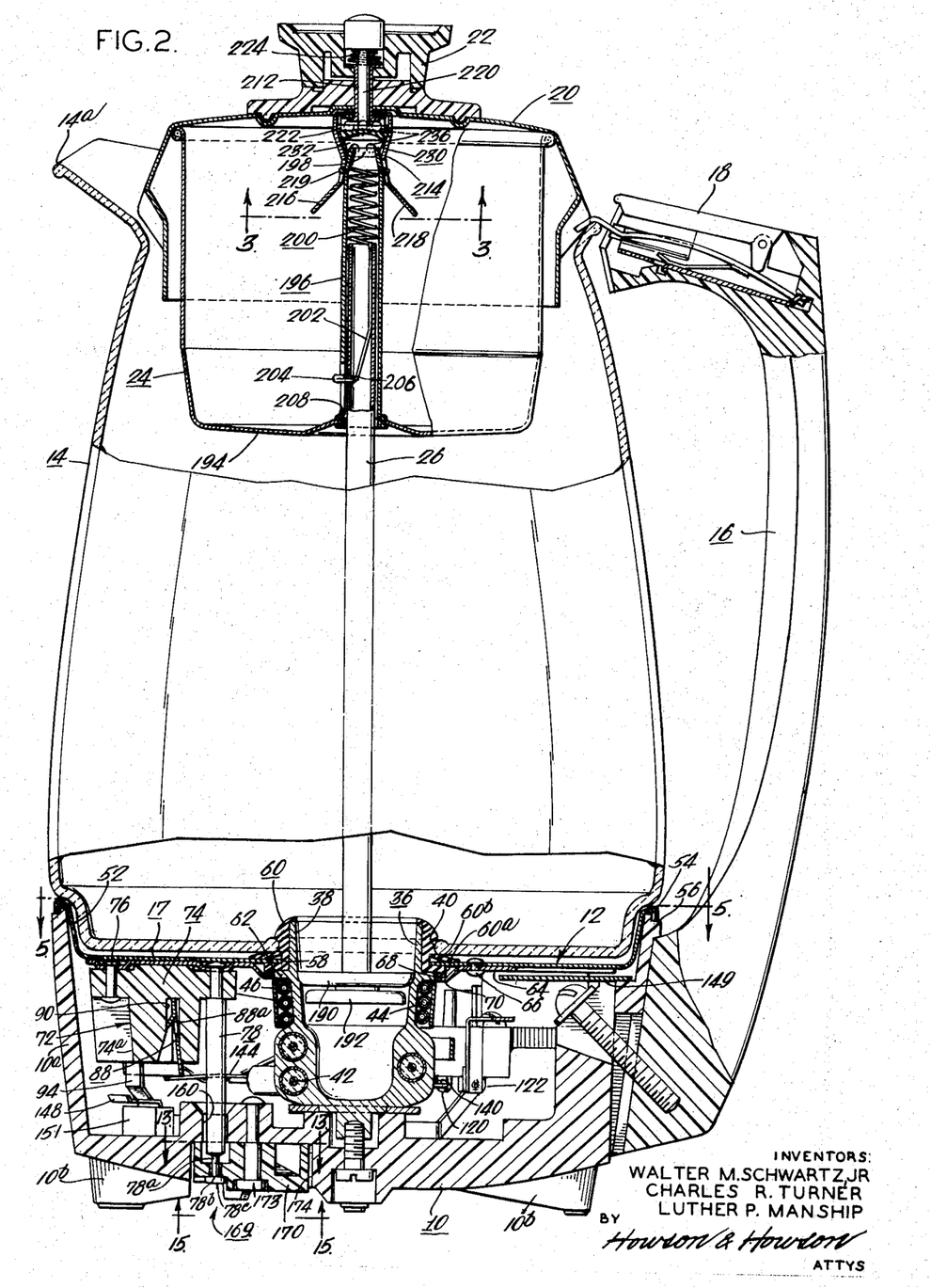
FIG. 2 is an enlarged side elevational view similar to FIG. 1, partially in section to show details of the lid and base of the percolator.

Closure 12 for the top opening of the base is provided by pan 17 having upwardly extending sidewalls 52 adjacent peripheral sidewall 10a of the base to provide a shallow well in the top of the base. The sidewalls 52 terminate in a rim 54 which overlaps the top of peripheral sidewall 10a of the base and abuts against support shoulder 56 around the top of sidewall 10a, as shown in FIGS. 2 and 5–9. The pan 17 is generally annular in form and has a central circular opening 58 to permit collar 38 of heat-pump well 36 to extend through the pan. The pan supports in its central opening an annular rubber sealing member 60 which is adapted to fit snugly over collar 38 and about flange 62 of the heat-pump well, when the pan is positioned on the base. The sealing member has an annular increased diameter rim 60a beneath the pan and an annular flap 60b which overlaps and seats on the upper surface of pan 17. When the pan, which carries the sealing member, is seated on the base, the outside of the sealing member together with flap 60b is conical in form and is adapted to support the container at its rim bounding opening 40, as shown in FIG. 2. The sealing member 60 serves as a seal between the container and heat-pump well and is carried by the closure for convenience in this embodiment, but in other embodiments the sealing member 60 could be fixed to the heat-pump well, for example. The container is supported a distance above pan 17 so that drops of liquid, which may flow down the outside of the container from its lip after a pouring operation, may flow between the container and base and onto the pan, as disclosed in a copending application entitled "Coffee Percolator," filed Oct. 31, 1966, Ser. No. 590,642, now Pat. No. 3,392,662, issued July 16, 1968, of Walter M. Schwartz, Jr., and of common assignee herewith. For a more detailed description of the arrangement of the pan and container, reference is made to the Schwartz application.

Pan 17 supports a plate 64 fixed to the under surface of the pan as by rivets 66. The plate conforms to the outer diameter of the bottom of pan 17 and extends over the greater portion of the bottom of the pan. Plate 64 is provided with an arcuate recess 68 conforming to opening 58 of the pan, plate 64 having a rim 70 bounding recess 68 for holding the sealing member 60 fixed to the pan 17.

Figure 7:
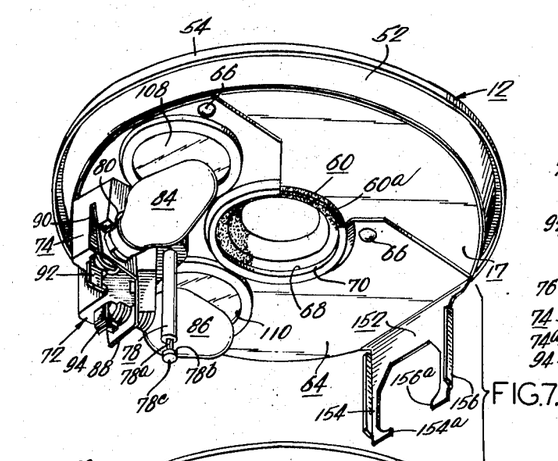
FIG. 7 is an exploded perspective view on a reduced scale of the closure and base of FIG. 6 with a portion of the base broken away and showing the closure and base before assembly.
Figure 8:
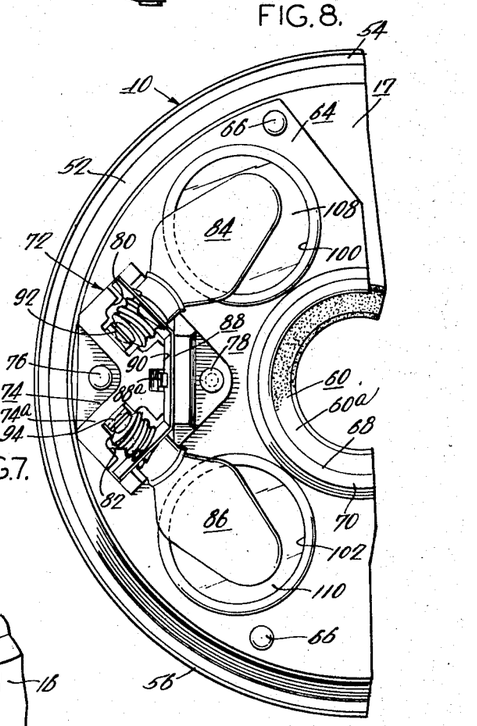
FIG. 8 is a fragmentary inverted plan view of the closure of FIG. 7.

As shown in FIGS. 5–8, plate 64 of closure 12 supports socket means generally designated 72 for electric lamps, which are adapted to illuminate the glass container. More specifically, socket means 72 comprises a socket member 74 of molded resinous material secured to plate 64, as by rivet 76 and pin 78. Socket member 74 has a raised portion 74a having sides with recesses 80 and 82 adapted to receive the bases of lamps 84 and 86, respectively. The lamps are held to the socket member by a sheet metal strip 88 extending through the recesses 80 and 82 and a slot 90 through the raised portion 74a. Strip 88 is held to the socket member by a tab 88a punched out of the strip and adapted to engage the sidewall of a slot, as shown in FIGS. 2 and 8. The strip 88 has openings lying in recesses 80 and 82 adapted to provide threaded engagement with the bases of lamps 84 and 86. Strip 88 with its threaded openings for receiving the lamps provides a common connection between the lamps and one of the terminals for supplying current to each of the lamps. The other terminals for the lamps are provided by sheet metal terminal members 92 and 94 force fitted within slots at the ends of recesses 80 and 82, respectively, of socket member 74. Terminal members 92 and 94 are adapted to abut against the terminal ends of the lamps when the lamps are threaded in the sockets.

Lamps 84 and 86 illuminate the container 14 through aligned openings 100 and 102, and 104 and 106, respectively, in plate 64 and pan 17, respectively, located above lamps 84 and 86. The openings 100 and 104 in the plate and pan, respectively, and openings 102 and 106 in the plate and pan, respectively, are closed by discs 108 and 110, respectively, of translucent material supported between the plate and pan in depressed rims around the openings in the plate. The discs have reduced diameter portions extending into the openings of the pan to close the openings. Preferably, sealing means, such as silicone cement, is placed around the outer periphery of the discs 108 and 110 to seal the openings in the pan so that any liquid or coffee which may flow onto the pan is prevented from seeping through the openings around the discs. The translucent discs are adapted to diffuse the light from the lamps to illuminate the container.

Figure 10:
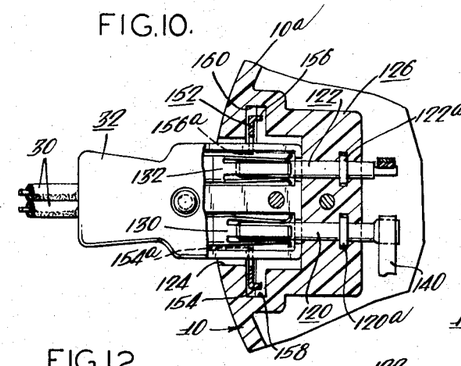
FIG. 10 is a fragmentary sectional view taken along line 10—10 of FIG. 6.

The terminal members 88, 92 and 94 of socket means 72 are arranged to be downwardly depending into the base when the closure is positioned on the base. The terminal members are adapted to be contacted by terminal means of a circuit connecting the heaters of the heat-pump well to a source of power. The percolator is provided with terminal posts 120 and 122, as shown in FIGS. 6, 9–11 and 23, which are engageable through an opening 124 in sidewall 10a of the base. The terminal posts are supported in grooves molded in partition 126, which forms an internal well around opening 124. Terminal posts 120 and 122 are provided with increased diameter portions 120a and 122a, as shown in FIGS. 6 and 10, which are received in slots communicating with the grooves in partition 126 to hold the terminal posts fixed in position when they are engaged for connecting the percolator to a source of power. The terminal posts are fixed in the grooves in partition member 126 by a cover member 128 fastened to the partition member, as by a screw, the cover closing the internal well formed by partition member 126 around the opening 124 in the sidewall of the base. The terminal posts 120 and 122 are adapted to be engaged by terminal pinch clips 130 and 132, respectively, which are connected to wires of electrical cord 30 in connector 32. The connector 32 is adapted to fit within opening 124 of base 10 to enable the terminal clips to engage the terminal posts for supplying electrical current to the percolator from a source of power to which the electrical cord is connected in a conventional manner.

Electrical current is carried from the terminal posts through circuit means supported in the base for connecting the heaters and socket means to the source of power. The circuit in the base has terminal means providing resilient contact arms which are engageable with the terminal members of the socket for lighting the lamps. As shown in FIGS. 6, 7, 9 and 23, conductive strips of metal, such as strip 140 connected to terminal post 120, are employed to electrically connect heaters 42 and 44 and thermostatic control switch 142, which controls the percolating and heating operations of well 36, to the terminal posts. The conductive strips are arranged to provide terminal contact arms 144, 146 and 148 supported in the base and adapted to contact terminal members 88, 92 and 94, respectively, of the socket means. More specifically, terminal contact arm 144 is provided by an conductive strip supported by a terminal of the primary heater 42 for engaging terminal member 88 of the lamp socket. Contact arms 146 and 148 are provided by conductive strips which are press-fitted within slots adjacent projections 150 and 151, respectively, of the base, resilient contact arms 146 and 148 being electrically connected to conductive strips of the circuit in the base.

Figure 12:
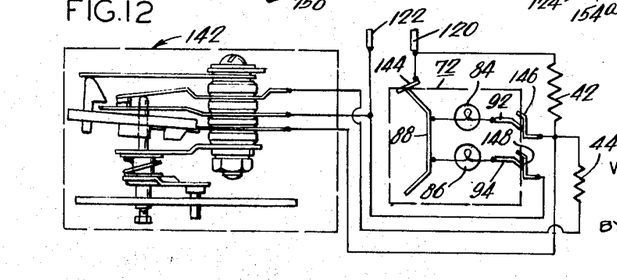
FIG. 12 is a side elevational view of the thermostatic switch preferably employed and showing its connection in the schematic circuit of the present invention.

The circuit in the base 10 connecting the terminal posts with the heaters, thermostatic control switch and socket means is schematically illustrated in FIG. 12. The circuit shown in FIG. 12 is similar to the circuit shown and described in the above-identified patent of Manship et al. The thermostatic switch and circuit for the heaters preferably employed is shown and described in a pending application entitled "Thermostatic Control Switch," Ser. No. 589,898, filed Oct. 27, 1966, now Pat. No. 3,425,016, issued Jan. 28, 1969, of Turner et al. and of common assignee herewith. The circuit components of FIG. 12 corresponding to the elements described in the base and closure of FIG. 7 are identified by the same number designators. Briefly, the circuit shows one end of primary heater 42 connected to terminal post 120 and the other end of the primary heater is connected to a blade of thermostatic control switch 142. Terminal post 122 is connected to another blade of the thermostatic control switch. The secondary heater 44 is electrically connected between a connection at the remote end of the primary heater 42 from terminal 120 and another blade of thermostatic control switch 142, in a manner described in the above-identified pending application of Turner et al. The terminal members 88, 92 and 94 of socket 72 are engaged by resilient contact arms 144, 146 and 148, respectively, as shown in FIG. 12 to electrically connect lamps 84 and 86 within the circuit of the percolator. In this arrangement, lamp 86 is continuously lighted as long as the percolator is connected to a source of power. Lamp 84 is lighted as long as the contacts of the thermostatic control switch are engaged for percolating operation, but lamp 84 goes out when these contacts open to disconnect the primary heater during the warming operation after percolation.

As shown in FIGS. 2, 5, 7 and 9, an arcuate shaped plate 149 of aluminumized steel may be secured at the top of a vertically extending rib 151 of sidewall 10a of the base, as by a screw, such that plate 149 extends horizontally into the base over thermostatic control switch 142. The plate is provided to protect the switch from being inadvertently struck when assembling the closure and base together.

In assembling the closure 12 and base 10, terminal members 88, 92 and 94 of the socket must be properly aligned with resilient terminal contact arms 144, 146 and 148 of the base for proper electrical connection to be made for lighting the lamps supported on the closure, as shown in FIG. 2. Alignment members are provided on the closure and mating alignment means are provided by the base for positioning the closure on the base in the desired position. The alignment members supported by the closure are provided by positioning pin 78 extending downwardly from the closure and alignment projection 152, which is formed as a downwardly turned flange of the plate 64. Pin 78 is received within positioning opening 160 through the bottom of the base. Alignment projection 152 has downwardly extending legs 154 and 156 received in slots 158 and 160, respectively, in the base molded in cover 128 and partition 126 of the base on opposite sides of and adjacent to terminal posts 120 and 122, the lower portions of slots 158 and 160 communicating with opening 124 in which the terminal posts are located. With pin 78 positioned in opening 160 and aligning legs 154 and 156 positioned in slots 158 and 160, respectively, the terminal members 88, 92 and 94 of the socket will engage the resilient contact arms 144, 146 and 148, respectively, of the base as a closure is positioned on the base with rim 54 of the closure abutting against shoulder 56 of base 10.

Figure 11:
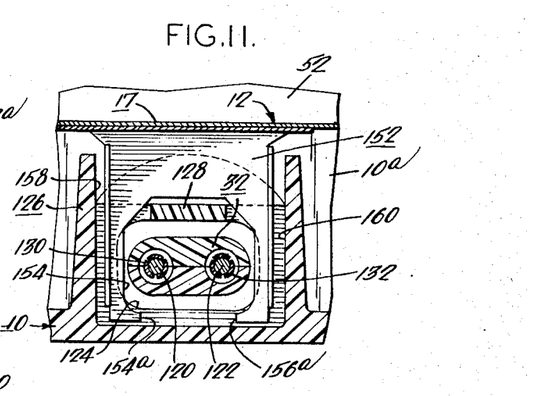
FIG. 11 is a fragmentary sectional view taken along line 11—11 of FIG. 6.

As shown in FIGS. 6, 10 and 11, legs 154 and 156 of alignment projection 152 are spaced apart such that they extend into the opening 124 of the base on opposite sides of the terminal posts 120 and 122. The legs 154 and 156 are provided with inwardly projecting ears 154a and 156a, respectively, which define an opening between the legs through which connector 32 may be positioned in opening 124 of the base to engage the terminal posts. The ears 154a and 156a of legs 154 and 156 provide a latch portion for the closure that are in overlapping relation with the connector, which provides a cooperating latch part therewith, so that alignment projection 152, and hence the closure, is interlocked with and prevented from being removed from the base when the connector engages the terminal posts, as shown in FIGS. 10 and 11. In this manner, the closure cannot be removed from the base and is held to the base when the connector engages the terminal posts so that a user disassembling the percolator cannot remove the closure to touch the circuit elements as long as the connector is positioned in the base to engage the terminal posts of the percolator. Thus, it is assured that the percolator will be disconnected from the source of power for safety of the user before the closure can be removed from the base. It should be appreciated that the closure and base components have such contours provided by the alignment members and mating alignment openings that they can be assembled together in only one possible way in order to avoid errors in assembly and assure proper electrical connection.

The closure and base components are also coupled together by further manually operable fastening means for holding the components together in an operable form. In the present instance, the fastening means is provided by latch means generally designated 169 which couples the components together such that they can be easily disassembled by unskilled persons and automatically assures that the electrical connections between the base and closure are properly made. The latch means 169 is provided by pin 78 which provides a latch portion for the closure, and a cooperating latch member 170, which provides a cooperating latch part attached to the base. Pin 78 serves as an alignment member and also provides a locking member for coupling the closure to the base when engaged by the latch member 170.

More specifically, latch member 170, shown in FIGS. 21 and 22, is circular in form and adapted to fit within a circular recess 174 formed in the outside bottom surface of base 10, as shown in FIGS. 2 and 13–20. Opening 160 in the bottom of the base opens into recess 174 at a position offset from the center of the recess. The latch member has a central opening through which a rivet 173 may extend to secure the latch member to the base, but permit rotation of the latch member in recess 174. Finger grip projections 176 and 177 of the latch member facilitate easy rotation of the latch member when the base is upended. Pin 78 in opening 160 extends into recess 174 and extends into a cavity 178 formed in the upper face of the latch member, as shown in FIGS. 16 and 17 where the latch member is positioned for initially receiving the pin.

To facilitate locking between the pin and latch member, pin 78 has a reduced diameter portion 78a located to fall just beneath the base in cavity 178 of latch member 170 when the closure is positioned on the base. The reduced diameter portion 78a of pin 78 provides an upwardly facing shoulder 78b. As previously stated, the latch member is formed so that when finger grip portion 177 is aligned with integral foot 10b of base 10 as shown in FIGS. 16 and 17, the lower portion of the pin may enter cavity 178, which is large enough to accommodate the full diameter bottom portion 78c of the pin. Cavity 178 around one side of the latch member communicates with an arcuate shaped opening 180 through the bottom surface 182 of the latch member, as shown in FIGS. 13–17, 21 and 22. Opening 180 narrows to a width smaller than the diameter of the pin, except at the reduced diameter portion of the pin, and is arcuate in form at a radius adapted to coincide with the position of the pin in the latch member. The walls of opening 180 are thinner than the reduced diameter portion lengthwise along the pin, the shoulders between the full and reduced diameter portions of the pin being adapted to embrace the latch member. The bottom surface 182 of the latch member is a semi-circular, helical camming surface as shown in FIGS. 14, 19 and 22. Upon rotating the latch member from its initial position for receiving the pin, as shown in FIGS. 16 and 17, in a clockwise direction as viewed in FIG. 16, shoulder 78b of the pin will engage camming surface 182 at a position along camming surface 182, as shown in FIGS. 2 and 13–15. The camming surface of the latch member bears downwardly on the shoulder of the pin and urges positive seating of the closure on the base, as well as provides a means for maintaining a tight connection therebetween to tolerate manufacturing variation and wear.

The pin is locked in position with the latch member, as shown in FIGS. 13, 14 and 15, with the closure secured to the base. Release of the pin from the latch member is accomplished by rotation of the finger grip portions 176 and 177 in a counterclockwise direction, as viewed in FIG. 15, until finger grip portion 177 is aligned with and adjacent to support foot 10b of the base, as shown in FIG. 16. At this position of the latch member, shoulder 78b of the pin will be free of camming surface 182 and within the cavity 178 of the latch member and the closure can then be lifted from the base.

In disassembling the closure and base after the container is removed, it is desirable to provide means for forcibly separating the closure from the base, since the contours of the closure and base snugly fit together. In the present instance, cavity 178 is arcuate in form and extends around one side of the latch member to communicate with opening 180 and extends around the other side of the latch member to provide a bottom camming surface 184 acting as a ramp up which the bottom 78c of pin 78 may ride, as shown in FIGS. 18–21. Camming surface 184 is semi-circular and helical in form and of a width to accommodate the bottom 78c of the pin. As the latch member is rotated in a counterclockwise direction from the position in FIG. 16, where the pin is free of opening 180, to the position shown in FIGS. 18–19, the bottom of the pin will ride up the camming surface to forcibly separate the closure from the base, as shown in FIG. 20. Therefore, after shoulder 78b of the pin is free of the locking camming surface 182 of the latch member, upon further rotation of the latch member the pan of the closure will be forced a distance upwardly from the base so that the closure can be easily removed. By the arrangement of latch member 170 cooperating with pin 78, the latch member not only provides positive locking of the closure in the proper seated position on the base, but also facilitates forcibly separating the closure from the base so that the closure can be easily lifted therefrom.

It should be appreciated that before the closure can be removed from the base, it is necessary to have the container removed from the base, as described in the above-identified patent of Manship et al. Also, cord connector 32 must be removed from the terminal posts before the closure can be removed from the base so that the ears 154a and 156a of legs 154 and 156 can be lifted past the terminal posts. By having the closure coupled to the base by manually releasable fastening means as described, easy access is provided into the base for repair or replacement of defective parts, and particularly enables easy and convenient access to the socket means on the closure for changing burnt out light bulbs. Also, the positive locking action between the closure and base provided by latch means 169 assures good electrical contact between the terminal members of the socket and the resilient contact arms supported in the base, thus eliminating the need for conventional electrical contact terminals between the base and closure.

After the closure and base have been coupled together by the latch means 169, the container 14 is seated on sealing member 60 and the latch means 18 in the upper portion of handle 16 is actuated to couple the container between the handle and base, as described in the above-cited patent of Manship et al. In this arrangement, as shown in FIG. 2, a clearance is provided between the container and pan 17 so that any drops of liquid which flow down the container from its pouring lip 14a may flow between the container and sidewall of the base and onto the shallow well pan, as described in the above-identified pending application of Schwartz.

As shown in FIG. 2, fountain tube 26 at its lower end is provided with a cup-shaped disc 190 with apertures and a valve disc 192 arranged to lie in the heat-pump well to facilitate precolation in a conventional manner. The upper portion of the fountain tube is secured to coffee basket 24 so that the fountain tube and coffee basket provide another component part of the percolator. Coffee grounds basket 24, which has a perforate bottom 194, is provided with a centrally located upstanding tube 196 adapted to accommodate the upper end of fountain tube 26. Top portion 198 of the upstanding tube is swaged inwardly to act as a stop to position the upper end of a coiled spring 200, which must be inserted upwardly from the bottom of the basket into upstanding tube 196. Spring 200 has its other end 202 extending generally axially into the fountain tube and terminating in a tang 204, which extends through an opening 206 in the sidewall of the fountain tube and through a slot 208 in the sidewall of upstanding tube 196. Slot 208 in the upstanding tube provides an elongated generally axially disposed opening in the upstanding tube adjacent the bottom of the coffee basket. Tang 204 of the spring is bent in a loop for rigidity in engagement between the tubes. The tang of the spring extending between the fountain tube and upstanding tube secures the fountain tube and coffee basket together but permits relative axial movement therebetween, the distance of movement being the axial length of slot 208 communicating with opening 206. Normally the spring biases tang 204 in opening 206 of the fountain tube against the bottom of slot 208 adjacent the bottom of the coffee basket.

With the coffee basket and fountain tube positioned in the container, as shown in FIG. 2, lid 20 is seated in the top opening of the container by spring biased detents 210, which are provided in the lip of the lid and arranged to fit beneath the neck of the container. When the lid is seated in the opening of the container, the lid is adapted to engage the top of the sidewalls of the coffee basket to force the basket downwardly into the container. In this arrangement, the basket will ride down the fountain tube comprising the spring and moving spring tang 204 upwardly in slot 208 of the upstanding tube. This interaction between the lid, coffee basket and fountain tube firmly seats the fountain tube in the heat-pump well and biases the rim of the coffee basket against the lid so that coffee grounds in the basket are prevented from moving out of the basket between the basket and lid.

Lid 20 is also adapted to releasably engage the upstanding tube of the coffee basket for lifting the coffee basket and fountain tube from the container, as described in the above-identified patent of Manship et al. Briefly, a tubular rivet 212 secures knob 22 to the lid and is seated against a central portion of a generally U-shaped resilient clasp 214 having downwardly depending members or fingers 216 and 218 inside the lid, as shown in FIG. 2, the rivet securing the knob, lid and clasp together. The opposed fingers 216 and 218 are biased together with openings in each finger to engage the ring portion 219 adjacent the top of upstanding tube 196. There is slidably mounted within the bore of rivet 212 a push button plunger 220 which terminates under the lid in actuator 222 between the fingers. The actuator of the push button is biased against the lid by a spring 24 supported in the knob between the push button and knob. To separate the basket from the lid, the push button is pressed against the bias of spring 224 to move actuator 222 between the fingers, moving the fingers outwardly from one another to release their grip on ring portion 219 of the upstanding tube.

In order to provide better distribution of the liquid forced up the fountain tube over the coffee in the coffee grounds basket, there is provided distribution means carried by the lid. As the water is heated in the heat-pump well, it is driven up the fountain tube and upstanding tube and overflows the top thereof into the coffee basket. This process repeats itself with successive increments of water until coffee is brewed in a conventional manner. The distribution means in the present instance is provided by members 216 and 218 of the clasp and a generally U-shaped deflection strip 230 of metal having opposed side members 232 and 234 extending between and generally perpendicularly disposed with respect to fingers 216 and 218, as shown in FIGS. 2, 3 and 4. Deflection strip 230 is secured to the lid at its central portion by rivet 212. The downwardly depending members 216, 218, 232 and 234 from the lid extend downwardly adjacent the top portion of the upstanding tube when the lid is seated on the container and provide a generally rectangular closure around the top portion of the upstanding tube. Distribution of the liquid over the coffee basket is provided by a plurality of apertures generally designated 236 in each of the members. The members with apertures 236 break up the spray pattern and distribute the increments of water driven up through the fountain tube in a uniform manner over the coffee grounds in coffee grounds basket 24.

When the percolator is desired to be disassembled, the lid, coffee basket and fountain tube can be lifted from the container by the lid. The container is released from the support base by release of latch means 18 in the handle. The cord connector 32 must be removed from the terminal posts of the percolator before the closure can be removed from the base. Then, the closure is releasable from the base by release of latch member 170 from pin 78 of the closure. After latch member 170 releases shoulder 78b of the pin, further rotation of the latch member provides positive camming of the closure from the base to separate the closure from the base, as shown in FIG. 17. It should be appreciated that the various components have such contours that they can be assembled together with the other components in only one possible way in order to avoid error in assembly and provide proper electrical connection between the closure and support base.

The component parts of the percolator can be redesigned within the scope of the invention to provide a greater or smaller number of components depending on the desires of the manufacturer. For example, as shown in FIGS. 24–27, the heating means including the heat-pump well, thermostatic control switch and related circuitry is made a separable component from the base component. In the modified arrangement of FIGS. 24–27, parts similar to those in the arrangement of the heating means and support base of FIGS. 1–12 are identified by the same number designators with the additions of primes thereto. The primary difference between FIGS. 1–9 and 24–27 lies in the heat-pump well, thermostatic switch and associated circuitry, as shown in FIG. 23, being supported on a platform 300, in FIGS. 24–27, which is removable from the base.

Figure 24:
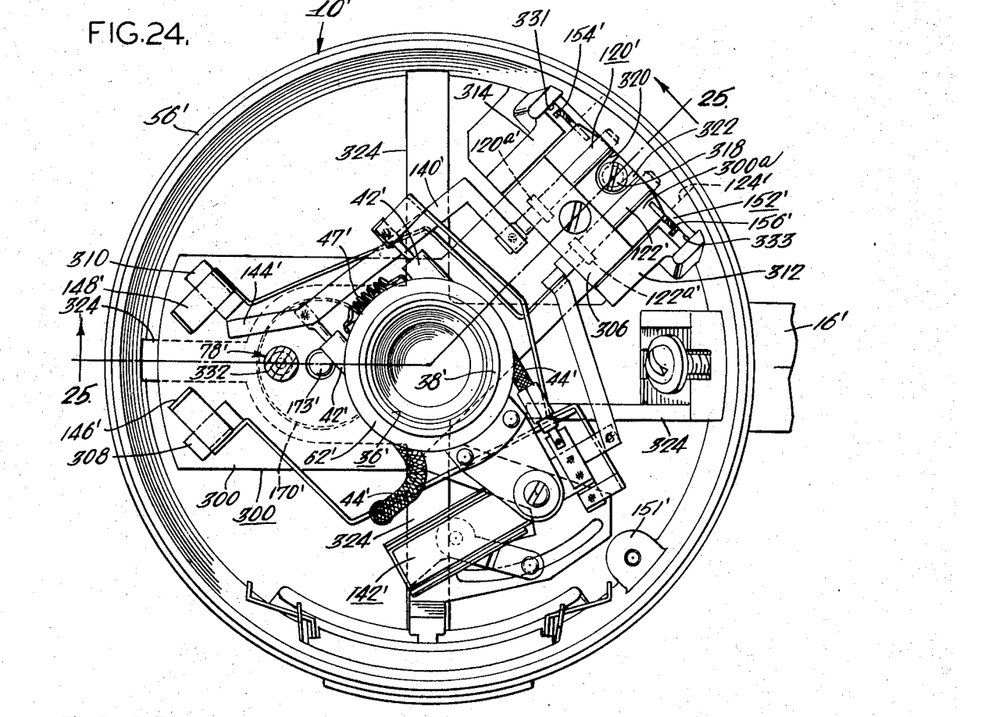
FIG. 24 is a plan view of a modified form of the percolator having separable base and heating means components and showing the container removed and closure broken away.
Figure 25:
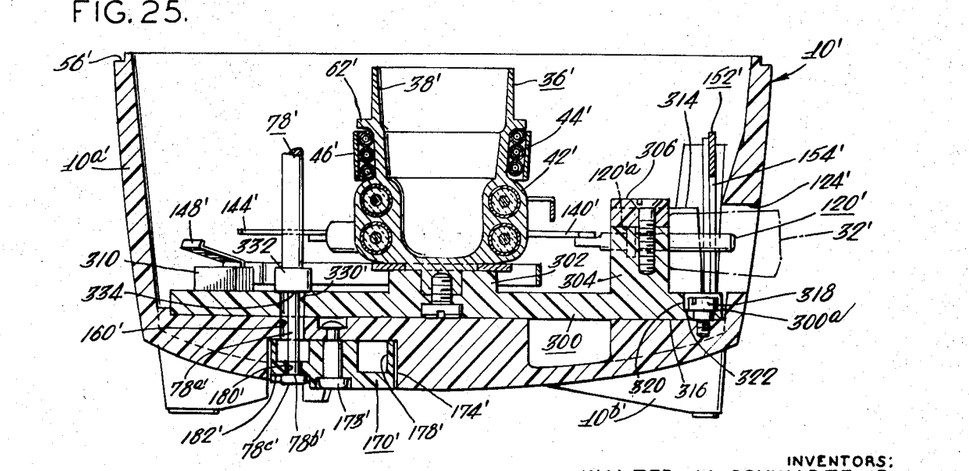
FIG. 25 is a sectional view taken along line 25—25 of FIG. 24 and showing the closure broken away.
Figure 26:
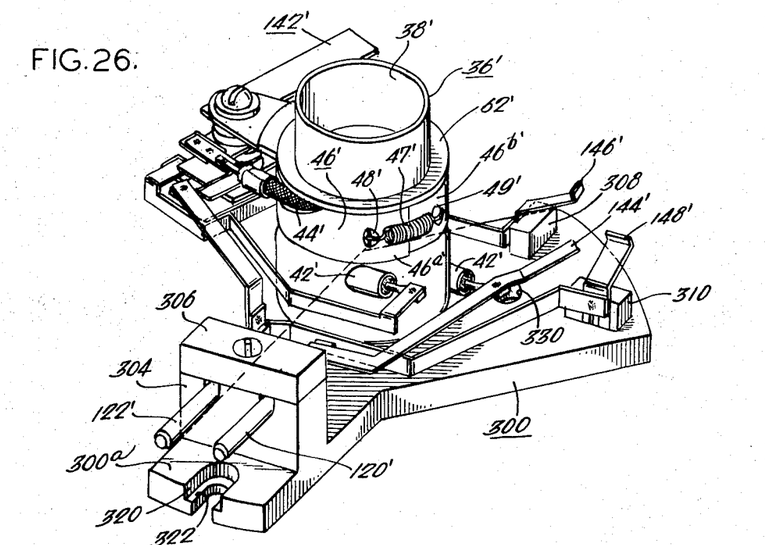
FIG. 26 is a perspective view of the heating means component of FIG. 24.

In the present instance, as shown in FIGS. 24–26, heat-pump well 36', thermostatic control switch 142', terminal posts 120' and 122', and their interconnecting circuit are supported on platform 300 in the same orientation of elements as in the embodiment of FIGS. 1–10. Also, the platform 300 orients the heating means elements in the base in the same orientation as the heating means elements in the base of FIGS. 1–10.

More specifically, heat-pump well 36' is seated on a boss 302 of the platform and is secured thereto as by a screw, as shown in FIG. 25. The terminal posts 120' and 122' rests within grooves across the top of upstanding projection 304 of the platform with the increased diameter portions 120a' and 122a' of the terminal posts being received in slots communicating with the grooves. A cover 306 is secured to projection 304, as by a screw, to hold the terminal posts fixed in position on the projection. Resilient terminal contact arms 146' and 148' are positioned in slots adjacent projections 308 and 310, respectively, of the platform. Resilient terminal contact arm 144' is supported by one end of primary heater 42' in a manner similar to contact arm 144 in FIG. 23. The circuit means interconnecting the terminal posts, resilient contact arms, heat-pump well and thermostatic control switch is the same as described in regard to FIG. 12, and the relative orientation of these parts on the platform is the same as the orientation of the corresponding parts in the support base of FIGS. 6–9 so that the same type closure and its orientation of parts can be employed.

Figure 27:
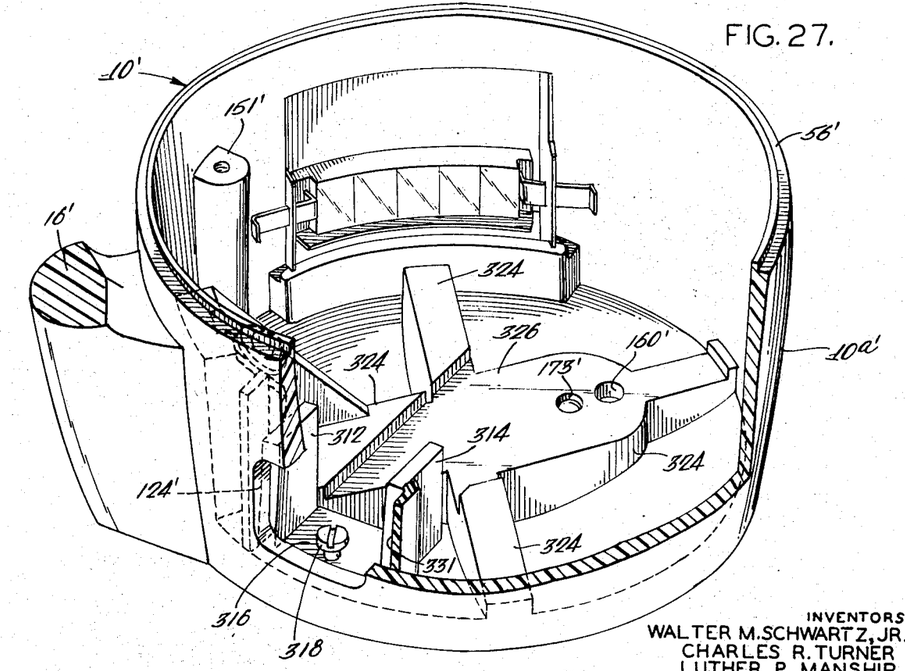
FIG. 27 is a perspective view of the base component of FIG. 24 with portions of the base broken away.

As shown in FIGS. 24, 25 and 27, support base 10' is generally similar to the support base 10 of FIGS. 1–11 except that the sidewalls of the base have been upwardly extended to accommodate the thickness of the platform and portions of the bottom of the base have been omitted to provide a recess accommodating the platform. In assembling platform 300 and base 10', end 300a of the platform supporting terminal posts 120' and 122' fits within ribs 312 and 314 of the base extending from the sides of opening 124' of the base. The end 300a of the platform rests on a projection 316 of the base between ribs 312 and 314, the projection 316 having an upwardly extending stud 318 adapted to be received in a stepped-shaped recess 320 in end 300a of the platform. Stepped-shaped recess 320 provides a shoulder 322 to fit beneath the head of stud 318, as shown in FIG. 25. Base 10' is provided with cross-shaped strengthening ribs generally designated 324 in its bottom and ribs 324 have portions omitted to provide a recessed surface 326 to accommodate and support the platform 300. Opening 160' in the support base accommodates pin 78' of the closure, pin 78' extending through the base to be received by latch member 170', in a manner as described in regard to FIGS. 2–22. Platform 300 has an opening 330 adapted to communicate with opening 160' of the base to accommodate pin 78'. With the platform positioned on surface 326 of the base and stud 318 of the base within recess 320 of the platform, the terminal posts 120' and 122' are accessible through opening 124' of the base for engagement with connector 32' as shown in FIGS. 24 and 25.

With the platform positioned in the support base 10', the closure, as described in FIGS. 1–11, may be seated on the support base with the alignment members of the closure being received in mating slots in the base. Particularly, alignment projection 152' of the closure has its legs 154' and 156' received in slots 331 and 333 formed in the ribs 312 and 314, respectively, adjacent opening 124' of the base. The legs of the closure overlap connector 32', in a manner described in regard to FIG. 11, so that the closure cannot be removed from the base while the connector is positioned in opening 124' to engage terminal posts 120' and 122'.

Platform 300 is securely held in the base 10' by pin 78' of the closure, which is slightly modified to engage platform 300. Pin 78' has an increased diameter portion 332 providing a downwardly facing shoulder 334 adapted to abut against the upper surface of platform 300 to hold the platform in the base. When the latch member 170' is rotated to have camming surface 182' in locking engagement with shoulder 78b' of pin 78', the latch member firmly forces shoulder 234 of the pin against the platform and firmly seats the closure on the base. Thus, the heating means component supported on platform 300 is interlocked with the closure and base by the latch mechanism coupling the closure and base together. With the heating means component positioned in the base and the closure coupled to the base, the resilient contact arms of the heating means are adapted to contact the terminal members of the socket on the closure, in a manner as described in regard to FIGS. 1–8. Upon release of the latch member 170' from pin 78', and removal of the closure, the heating means component may be easily removed from the base for repair or replacement of the entire component.

It should be appreciated that many other interconnections between the base, heating means and closure components may be made in accordance with the invention to provide disassembly of the components without the use of tools. It should also be appreciated that the number of component parts employed in the percolator could be further enlarged, for example, to have the handle generally designated 16 in FIG. 2 as a separate component part coupled to the base by manually releasable fastening means. In this manner, if the latch means 18 in the handle became defective, the handle could be manually released from the base and replaced.

It will be observed that the percolator of the present invention comprising component parts, including a container for liquid, a support base and a closure for the base, coupled together by manually operable fastening means provides advantages over the prior art percolators. The releasable fastening means for coupling together the closure and support base in an operative form may be simply and inexpensively manufactured for quick and easy assembly of the component parts without using tools. Moreover, if the percolator is dropped breaking any portion of the base, or if a malfunction occurs in the base, the percolator components can be easily and quickly disassembled manually by the unskilled user, who may install a replacement part without expensive labor costs. Furthermore, the alignment means employed to selectively position relative parts assures proper alignment of the parts in an operative form and allows the parts to be assembled together in only one form to avoid the errors in assembly. The alignment means not only cooperates to have the component parts in proper mechanical alignment but also functions to properly align electrical connections. In addition, the latch mechanism for coupling the closure and base components together also functions to provide forcible separation of the parts for easy access into the base. The safety feature of employing an interlocking relationship between the closure and cord connector when the connector is engaged with the terminals of the base prevents electrical shock to the user when disassembling the base and closure components of the percolator.

While the present invention has been described with particular reference to specific embodiments, it should be understood that it may be embodied in a large variety of forms different from the ones specifically shown and described without departing from the scope and spirit of the present invention as defined by the appended claims.

We claim:

1. A percolator comprising a plurality of components including a base component having a peripheral wall and an opening in its top, a closure component for the top opening of the base, the closure and base components having manually operable latch means holding the closure component to the base component and permitting assembly and disassembly of the closure and base components manually and without the use of tools in order to provide access to structure in the base compenent, a container component for liquid mounted on the base and being separate from the closure component, and means coupling the container component to at least one of the other components, the closure component being out of contact with liquid which circulates to the container component.

2. A percolator comprising a plurality of components including a container component for liquid; a base component having a peripheral wall and an opening in its top; a closure component for the top opening of the base component and being out of contact with liquid which circulates to the container component and being separate from the container component; one of the base and closure components having a latch portion, a cooperating latch part engaging the latch portion, the latch portion and the cooperating latch part comprising manually operable latch means coupling the closure component to the base component; and means coupling the container component to at least one of the other components, whereby the latch means permits assembly and disassembly of the closure and base components manually and without the use of tools in order to provide access to structure in the base component.

3. A percolator comprising a plurality of components including a base component having a peripheral wall and an opening in its top; a closure component for the top opening of the base component; one of the closure and base components having a latch portion, a cooperating latch part engaging the latch portion, the latch portion and the cooperating latch part comprising manually operable latch means holding the closure component to the base component and permitting assembly and disassembly of the closure and base components manually and without the use of tools; a container component for liquid mounted on the base component; and means coupling the container component to at least one of the other components; the base component including heating means having walls defining a heat-pump well engageable through the closure component and circuit means connectable to a source of power for supplying current to the heating means and having terminal means supported in the base component; the closure component including socket means for an electrical lamp supported between the closure and the base components, the closure component having terminal members to contact the terminal means of the circuit means when the closure component is latched to the base component for connecting the socket means to the source of power.

4. The percolator of claim 28 in which the terminal means comprise contact arms made of a resilient material to bias the contact arms against the terminal members when the closure component is latched to the base component.

5. A percolator comprising a plurality of components including a base component having a peripheral wall and an opening in its top; a closure component for the top opening of the base component; one of the closure and base components having at latch portion, cooperating latch means engaging the latch portion, the latch portion and the cooperating latch part comprising manually operable latch means holding the closure component to the base component and permitting assembly and disassembly of the closure and base components manually and without the use of tools; a container component for liquid mounted on the base component; and means coupling the container component to at least one of the other components; the base component including heating means having walls defining a heat-pump well engageable through the closure component and circuit means in the base for supplying current to the heating means, the circuit means having terminal elements engageable through an opening in the base component for being connectable to a source of power; the closure component having interlocking means providing the latch portion for preventing the closure component from being removed from the base component when the terminal elements are connected to a source of power.

6. The percolator of claim 5 in which a connector is provided for engaging the terminal elements to supply current from a source of power to the circuit means, the connector providing the cooperating latch parts, and the interlocking means includes a downwardly extending portion of the closure component, the downwardly extending portion having a projection adjacent the terminal elements in overlapping relation to the connector such that the closure component is prevented from being removed from the base component by the interlocking means when the connector is in its engaged position with the terminal elements.

7. The percolator of claim 1 in which the manually operable latch means provides such contours to the closure and base components that they can be assembled together in only one possible way in order to avoid errors in assembly.

8. The percolator of claim 1 in which the latch means includes an element supported by one of the base and closure components and a latch member supported by the other component releasably engaging the element for holding the closure component to the base component.

9. A percolator comprising a plurality of components including a base component having a peripheral wall and an opening in its top, a closure component at the top opening of the base component, the closure and base components having manually operable latch means holding the closure component to the base component and permitting assembly and disassembly of the closure and base components manually and without the use of tools in order to provide access to structure in the base component, a container component for liquid mounted on the base component, and means coupling the container component to at least one of the other components, the latch means including a pin supported by the closure component to be received within the opening in the base component and a latch member supported by the base component engaging the pin for releasably holding the closure component to the base component.

10. The percolator of claim 9 in which the latch member is provided with a camming surface which cooperates with the pin to firmly hold the closure component in position on the base component.

11. The percolator of claim 9 in which the latch member is provided with a first camming surface which engages the pin to firmly hold the closure component in position on the base component and a second camming surface adapted to engage the pin after the pin is disengaged from the first camming surface to move the pin relative to the base component to separate the closure component from the base component.

12. A percolator comprising a plurality of components including a base component having a peripheral wall and an opening in its top, a closure component for the top opening of the base, the closure and base components having manually operable latch means holding the closure component to the base component and permitting assembly and disassembly of the closure and base components manually and without the use of tools in order to provide access to structure in the base component, a container component for liquid mounted on the base, means coupling the container component to at least one of the other components, the closure component being out of contact with liquid which circulates to the container component, and means for manually moving the closure component away from the base component for separating the closure component from the base component after the latch means has been released.

13. A percolator comprising a plurality of components including a base component having a peripheral wall and an opening in its top; a closure component for the top opening of the base component; one of the closure and base components having a latch portion, a cooperating latch part engaging the latch portion, the latch portion and the cooperating latch part comprising manually operable latch means holding the closure component to the base component and permitting assembly and disassembly of the closure and base components manually and without the use of tools; a container component for liquid mounted on the base component; means coupling the container component to at least one of the other components; the base component including heating means having walls defining a heat-pump well and circuit means electrically connected to the heating means and having terminal elements engageable through an opening in the base component; and a connector component engageable with the terminal elements and having means connectable to a source of power for supplying electrical current to the heating mean; the closure component being provided with interlocking means for overlapping at least a portion of the connector component such that the closure component is prevented from being removed from the base component when the connector component is in its engaged position with the terminal elements.

14. A percolator comprising a plurality of components including a base component having a peripheral wall and an opening in its top; a closure component for the top opening of the base component; one of the closure and base components having a latch portion, a cooperating latch part engaging the latch portion, the latch portion and the cooperating latch part comprising manually operable latch means holding the closure component to the base component and permitting assembly and disassembly of the closure and base components manually and without the use of tools; a container component for liquid mounted on the base component; means coupling the container to at least one of the other components; and at least one component other than the container, closure and base components being arranged so that when the manually operable latch means is effective at least one component is interlocked between the closure and base components.

15. The percolator of claim 30 in which at least one component interlocked with at least two of the other components comprises heating means having walls defining a heat-pump well and having associated circuit means for connecting the heating means to a source of power, the heating means component being interlocked between the closure and base components.

16. The percolator of claim 14 in which the latch portion includes an element supported by one of the closure and base components and the cooperating latch part is supported by the other component, the cooperating latch part being movable to engage the element for holding the closure component to the base component.

17. The percolator of claim 15 in which the heating means component further includes a thermostatic control switch and terminal elements electrically connected to the circuit means and engageable through an opening in the base component for being connected to a source of power, the closure component having interlocking means for preventing the closure component from being removed from the base component when the terminal elements are connected to a source of power.

18. A percolator comprising a plurality of components including at least a base component, a member mounted on the base component having walls defining a heat-pump well, the walls of the heat-pump well having an upper portion and a lower portion, a container component for liquid mounted on at least one of the other components, a first heater in heat-transfer relationship primarily with one portion of the well and being fixed to the well, a second heater including resistance wire with an insulating covering wrapped around the other portion of the walls of the wall, a flexible strip of metallic material positioned over the resistance wire of the second heater around the walls of the well and having slots in opposed portions, and a spring having its ends engaged in the slots of the flexible strip to urge the opposed portions of the flexible strip firmly together to hold the second heater firmly against the walls of the well.

19. A percolator comprising a plurality of components including a container component for liquid having an open upper end, a fountain tube and coffee grounds basket component disposed in the container component, a cover component for the open end of the container component and having means releasably holding the cover component to the container component, the basket having a central upstanding tube fitting over an upper end of the fountain tube, the upstanding tube having an elongated generally vertically disposed opening in a sidewall thereof, the fountain tube having an opening in a sidewall thereof communicating with the opening in the upstanding tube, and a coiled spring confined at one end in the upstanding tube and having a tang at its other end extending through the openings in the fountain tube and upstanding tube, the spring securing the tubes together and permitting relative movement therebetween and urging the basket against the cover component when the cover component is held to the container component.

20. The percolator of claim 19 in which the elongated generally vertically disposed opening in the upstanding tube extends from adjacent the bottom of the basket, and the tang of the spring is provided with a loop extending through the openings in the tubes.

21. A percolator comprising a plurality of components, including a container component for liquid having a bottom opening and an open upper end, a removable cover component for the open upper end of the container component, heating means having a heat-pump well communicating with the bottom opening in the container component for causing percolation of liquid, fountain tube means extending from the heat-pump well to adjacent the cover component, a perforate coffee grounds basket disposed in the container and having an opening in the bottom thereof receiving the fountain tube means, and distribution means supported by the cover component extending adjacent the fountain tube means and having a plurality of apertures therein for allowing liquid to pass therethrough for distributing the liquid into the coffee basket.

22. The percolator of claim 21 in which the distribution means comprises a member fixed to the cover component and extending adjacent the fountain tube means, the member generally providing a closure around the top portion of the fountain tube means and having a plurality of apertures therein for allowing liquid to pass through the member into the coffee basket.

23. The percolator of claim 21 in which the distribution means comprises opposed pairs of members supported by the cover component and depending adjacent sidewalls of the fountain tube means, the members having a plurality of apertures therein around the top portion of the fountain tube means for allowing liquid to pass through the members into the coffee basket.

24. A percolator comprising a plurality of components including a base component having a peripheral wall and an opening in its top and a closure component for the top opening of the base component; one of the closure and base components having a latch portion, a cooperating latch part engaging the latch portion, the latch portion and latch part comprising manually operable latch means holding the closure component to the base component and permitting assembly and disassembly of the closure and base components manually and without the use of tools in order to provide access to structure in the base component, the latch portion including a pin on one of the closure and base components and the cooperating latch part releasably engaging the pin to hold the closure and base components together, one of the closure and base components having alignment means to provide such contours to the closure and base components so that they can be assembled together in only one orientation.

25. A percolator comprising a plurality of components including a base component having a peripheral wall and an opening in its top and a closure component for the top opening of the base component; one of the closure and base components having a latch portion, a cooperating latch part engaging the latch portion, the latch portion and the cooperating latch part comprising manually operable latch means holding the closure component to the base component and permitting assembly and disassembly of the components manually and without the use of tools; the base component including heating means mounted therein and circuit means having terminal elements engageable through an opening in the base; the latch portion including interlocking means on the closure component and the cooperating latch part including a connector engaging the terminal elements to supply current from a source of power, the connector cooperating with the interlocking means such that when the connector is in its engaged position with the terminal elements the closure and base components are held together.

26. A percolator comprising a plurality of components including a container component for liquid; a base component having a peripheral wall and an opening in its top, a closure component for the top opening of the base component and being out of contact with liquid which circulates to the container component; one of the base and closure components having a latch portion, a cooperating latch part engaging the latch portion, the latch portion and the cooperating latch part comprising manually operable latch means coupling the closure component to the base component; and means coupling the container component to at least one of the other components; the base component including heating means having walls defining a heat-pump well and circuit means having terminal elements engageable through an opening in the base component; the latch portion including interlocking means on the closure component and the cooperating latch part including a connector for engaging the terminal elements to supply current from a source of power, the connector cooperating with the interlocking means such that when the connector is in its engaged position with the terminal elements the closure and base components are held together, whereby the manually operable latch means permits assembly and disassembly of the closure and base components manually and without the use of tools.

27. The percolator of claim 26 in which the interlocking means includes a portion of the closure component through which the connector extends such that the closure component is prevented from being removed from the base component when the connector is in its engaged position with the terminal elements.

28. The percolator of claim 3 in which the cooperating latch part is supported by the other of the closure and base components.

29. The percolator of claim 13 in which the cooperating latch part is supported by the other of the closure and base components.

30. The percolator of claim 14 in which the cooperating latch part is supported by the other of the closure and base components.

31. The percolator of claim 24 in which the cooperating latch part is supported by the other of the closure and base components.

References Cited

UNITED STATES PATENTS

| 2,692,937 | 10/1954 | Clark | 219—436 |
|---|---|---|---|
| 1,720,463 | 7/1929 | Both | 174—66 X |
| 1,731,882 | 10/1929 | Backer | 219—436 |
| 3,392,662 | 7/1968 | Schwartz | 219—438 X |
| 3,011,428 | 12/1961 | Kircher | 99—310 |
| 3,280,303 | 10/1966 | Krauss et al. | 219—436 X |
| 3,323,441 | 6/1967 | Manship et al. | 99—310 |
| 3,333,087 | 7/1967 | Manship et al. | 99—310 X |
| 2,763,767 | 9/1956 | Lohrman et al. | 219—441 |
| 2,537,167 | 1/1951 | Snyder | 219—441 |
| 2,573,237 | 10/1951 | Wilcox | 219—441 X |
| 2,856,844 | 10/1958 | Price | 219—441 |
| 3,369,105 | 2/1968 | Wheeler | 219—441 |
| 3,282,196 | 11/1966 | Manship et al. | 99—310 |

BERNARD A. GILHEANY, Primary Examiner

R. N. ENVALL, JR., Assistant Examiner

U.S. Cl. X.R.

99—310